US011216378B2

(12) United States Patent
King et al.

(10) Patent No.: US 11,216,378 B2
(45) Date of Patent: Jan. 4, 2022

(54) TECHNIQUES FOR HANDLING CACHE COHERENCY TRAFFIC FOR CONTENDED SEMAPHORES

(71) Applicant: Advanced Micro Devices, Inc., Sunnyvale, CA (US)

(72) Inventors: John M. King, Austin, TX (US); Gregory W. Smaus, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1009 days.

(21) Appl. No.: 15/268,798

(22) Filed: Sep. 19, 2016

(65) Prior Publication Data

US 2018/0081810 A1     Mar. 22, 2018

(51) Int. Cl.
| | | |
|---|---|---|
| G06F 12/08 | (2016.01) | |
| G06F 12/0808 | (2016.01) | |
| G06F 12/0815 | (2016.01) | |
| G06F 12/0844 | (2016.01) | |
| G06F 12/0877 | (2016.01) | |
| G06F 9/52 | (2006.01) | |

(52) U.S. Cl.
CPC .......... *G06F 12/0844* (2013.01); *G06F 9/522* (2013.01); *G06F 12/0815* (2013.01); *G06F 12/0877* (2013.01); *G06F 2212/1008* (2013.01); *G06F 2212/1016* (2013.01); *G06F 2212/1032* (2013.01)

(58) Field of Classification Search
CPC .. G06F 11/08; G06F 11/1402; G06F 11/1435; G06F 11/3447; G06F 12/02; G06F 12/0828; G06F 12/1027; G06F 12/1036; G06F 12/121; G06F 2209/521

USPC ........................................................ 711/145
See application file for complete search history.

(56) References Cited

U.S. PATENT DOCUMENTS

| | | | | | |
|---|---|---|---|---|---|
| 5,526,510 | A | * | 6/1996 | Akkary | ............... G06F 12/0831 710/57 |
| 2006/0005197 | A1 | * | 1/2006 | Saha | ....................... G06F 9/526 718/104 |
| 2008/0307166 | A1 | * | 12/2008 | Gunna | .................. G06F 9/3867 711/140 |
| 2008/0307167 | A1 | * | 12/2008 | Gunna | ................ G06F 12/0833 711/143 |
| 2008/0307173 | A1 | * | 12/2008 | Yeh | ..................... G06F 12/0607 711/157 |

* cited by examiner

*Primary Examiner* — Mohamed M Gebril
(74) *Attorney, Agent, or Firm* — Volpe Koenig

(57) ABSTRACT

The techniques described herein improve cache traffic performance in the context of contended lock instructions. More specifically, each core maintains a lock address contention table that stores addresses corresponding to contended lock instructions. The lock address contention table also includes a state value that indicates progress through a series of states meant to track whether a load by the core in a spin-loop associated with semaphore acquisition has obtained the semaphore in an exclusive state. Upon detecting that a load in a spin-loop has obtained the semaphore in an exclusive state, the core responds to incoming requests for access to the semaphore with negative acknowledgments. This allows the core to maintain the semaphore cache line in an exclusive state, which allows it to acquire the semaphore faster and to avoid transmitting that cache line to other cores unnecessarily.

15 Claims, 7 Drawing Sheets

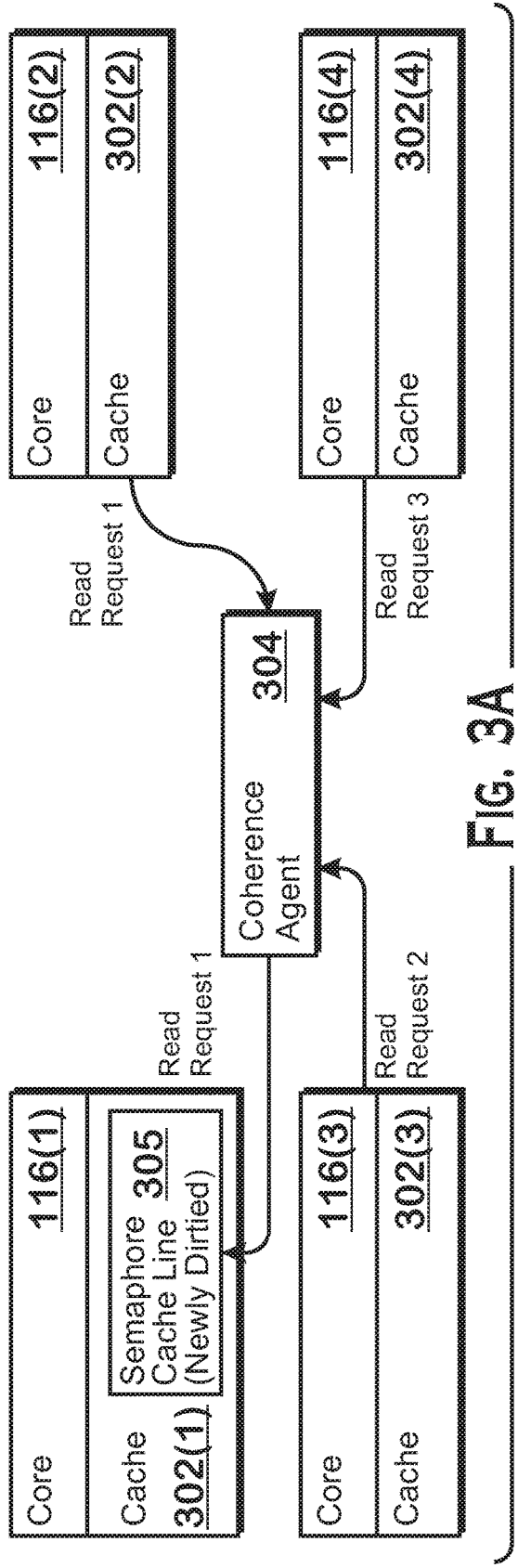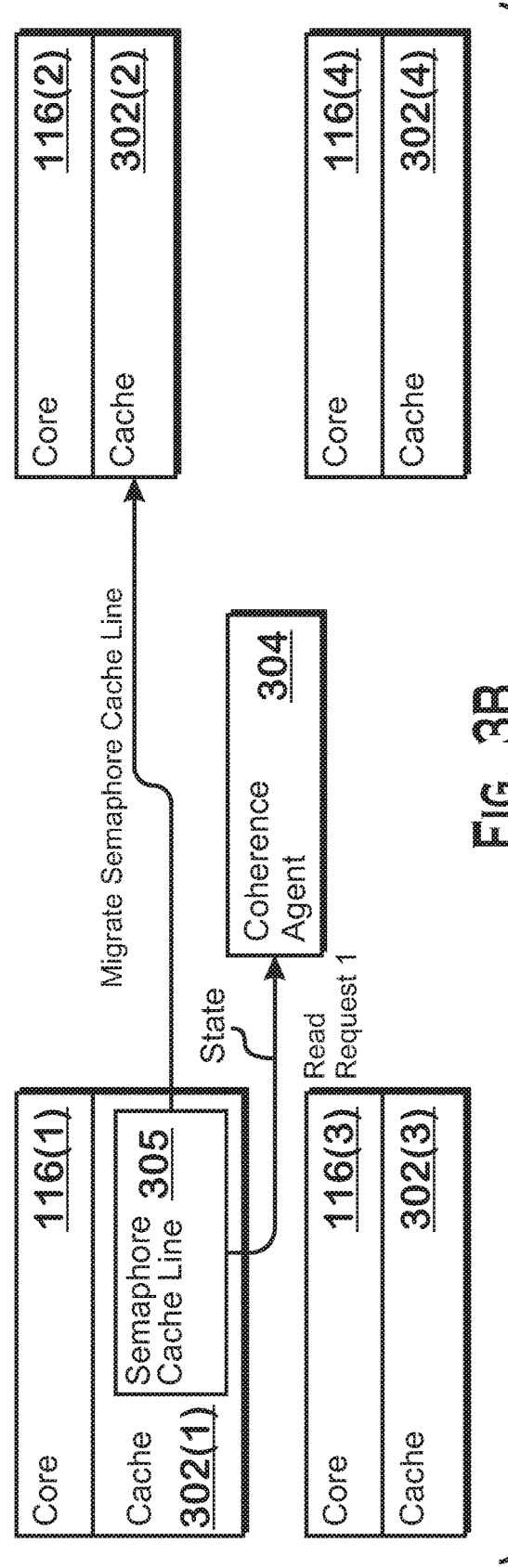

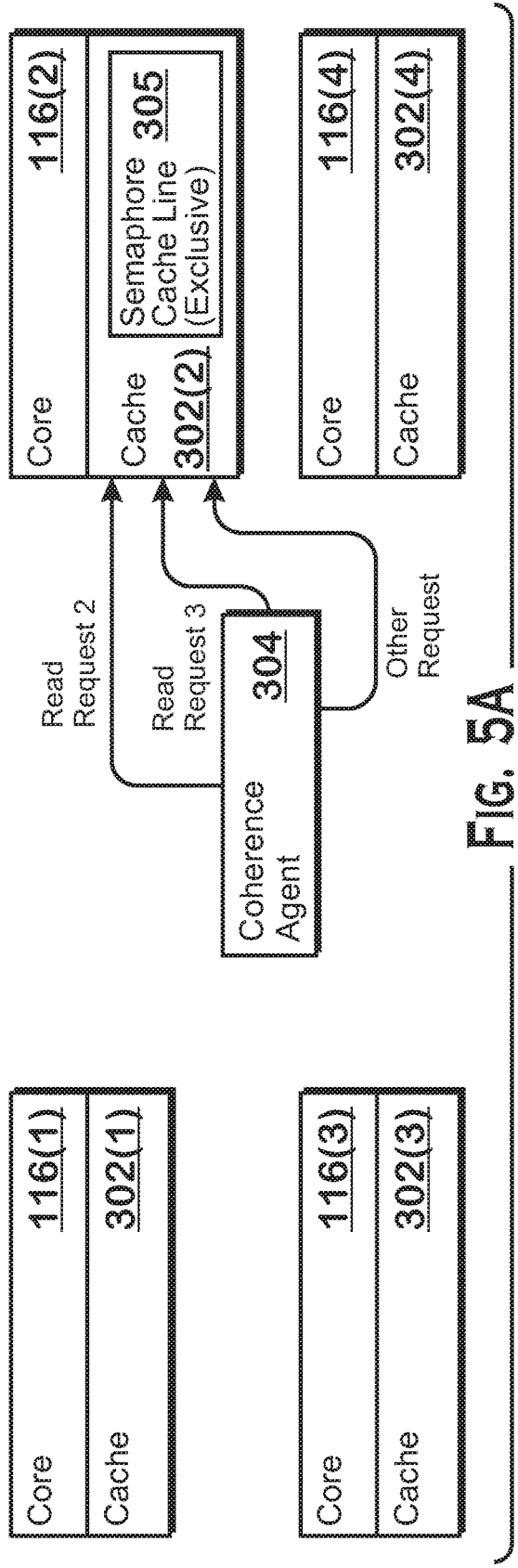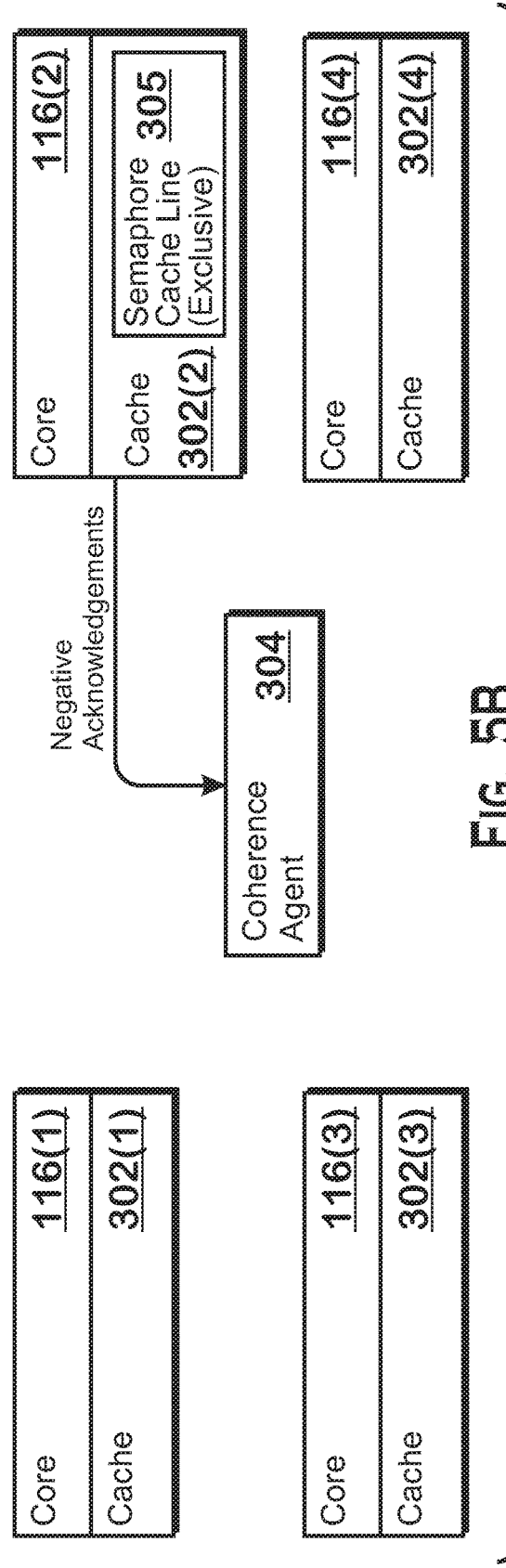

TECHNIQUES FOR HANDLING CACHE COHERENCY TRAFFIC FOR CONTENDED SEMAPHORES

BACKGROUND

A semaphore is a mechanism that allows for mutual exclusion by multiple threads in concurrent programming. Semaphores are used to guarantee that only one thread accesses shared memory or otherwise performs "critical" work that should only be performed by a single thread at a time. In use, a thread acquires a semaphore, performs the critical work, and then releases the semaphore so that other threads may use the semaphore. In certain situations, a contested semaphore may lead to an undesirably high amount of cache coherency traffic and high latencies for the acquisition of the semaphore.

BRIEF DESCRIPTION OF THE DRAWINGS

A more detailed understanding may be had from the following description, given by way of example in conjunction with the accompanying drawings wherein:

FIGS. 3A-3D illustrate a situation in which semaphore acquisition causes a greater-than-desirable amount of cache traffic with a migratory sharing cache coherence protocol;

FIGS. 5A and 5B illustrate cache operations utilizing a lock address contention table to prevent unnecessary cache traffic associated with acquisition of a contended semaphore, according to an example.

DETAILED DESCRIPTION

The techniques described herein improve cache traffic performance in the context of contended lock instructions. More specifically, each core maintains a lock address contention table that holds addresses corresponding to contended lock instructions. The lock address contention table also includes a state value that indicates progress through a series of states meant to track whether a load by the core in a spin-loop associated with semaphore acquisition has obtained the semaphore in an exclusive state. Upon detecting that a load in a spin-loop has obtained the semaphore in an exclusive state, the core responds to incoming requests for access to the semaphore with negative acknowledgments. This allows the core to maintain the semaphore cache line in an exclusive state, to acquire the semaphore faster, and to avoid transmitting that cache line to other cores unnecessarily.

Figure 1:
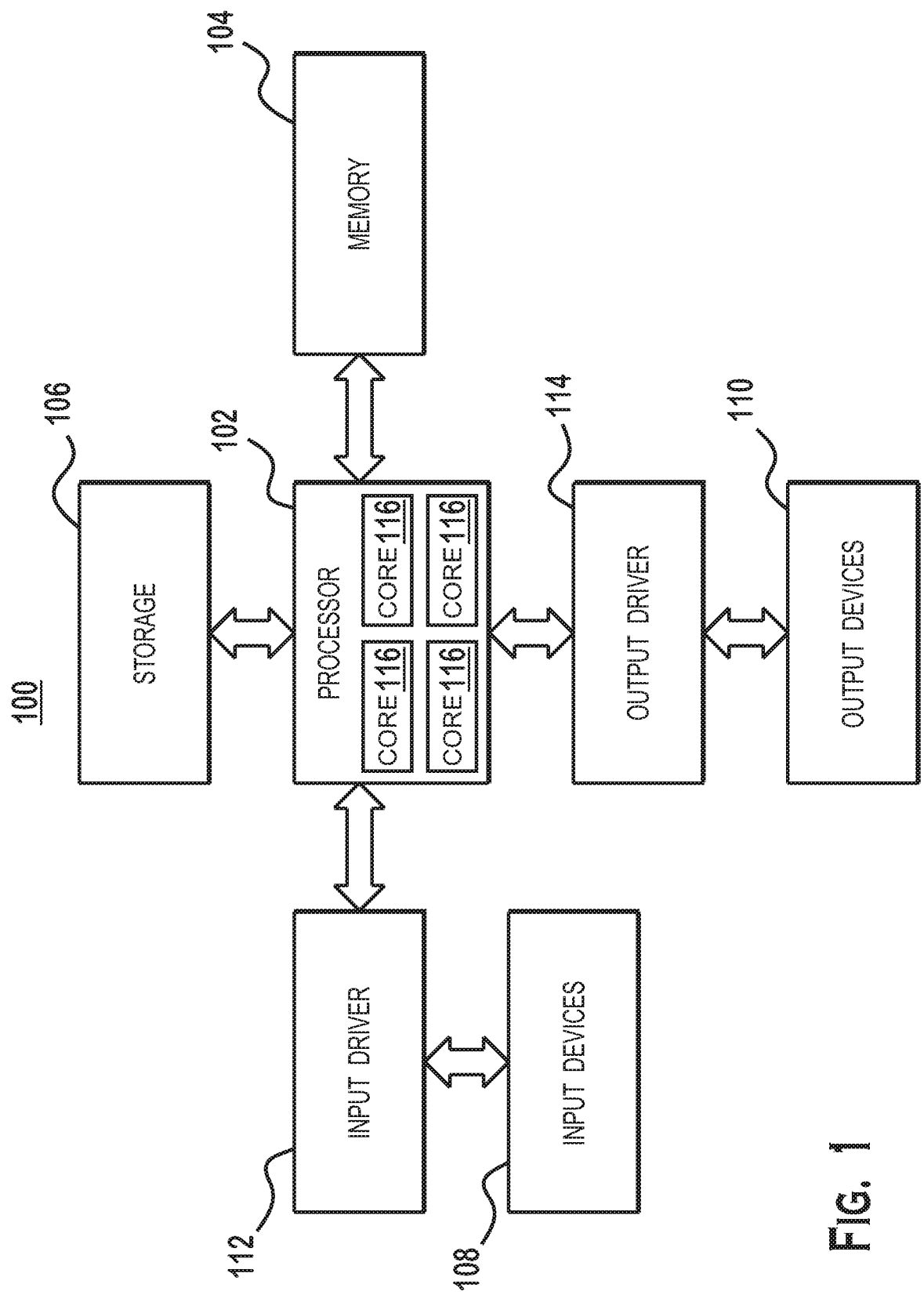
FIG. 1 is a block diagram of an example device in which one or more disclosed features may be implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 may also optionally include an input driver 112 and an output driver 114. It is understood that the device 100 may include additional components not shown in FIG. 1.

The processor 102 includes multiple cores 116. In one example, each core 116 is a central processing unit (CPU). In other examples, each core 116 is one of a central processing unit (CPU) or a graphics processing unit (GPU). The multiple cores 116 execute independent workloads that have the ability to coordinate through memory mechanisms and through coherence mechanisms. The memory 104 may be located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
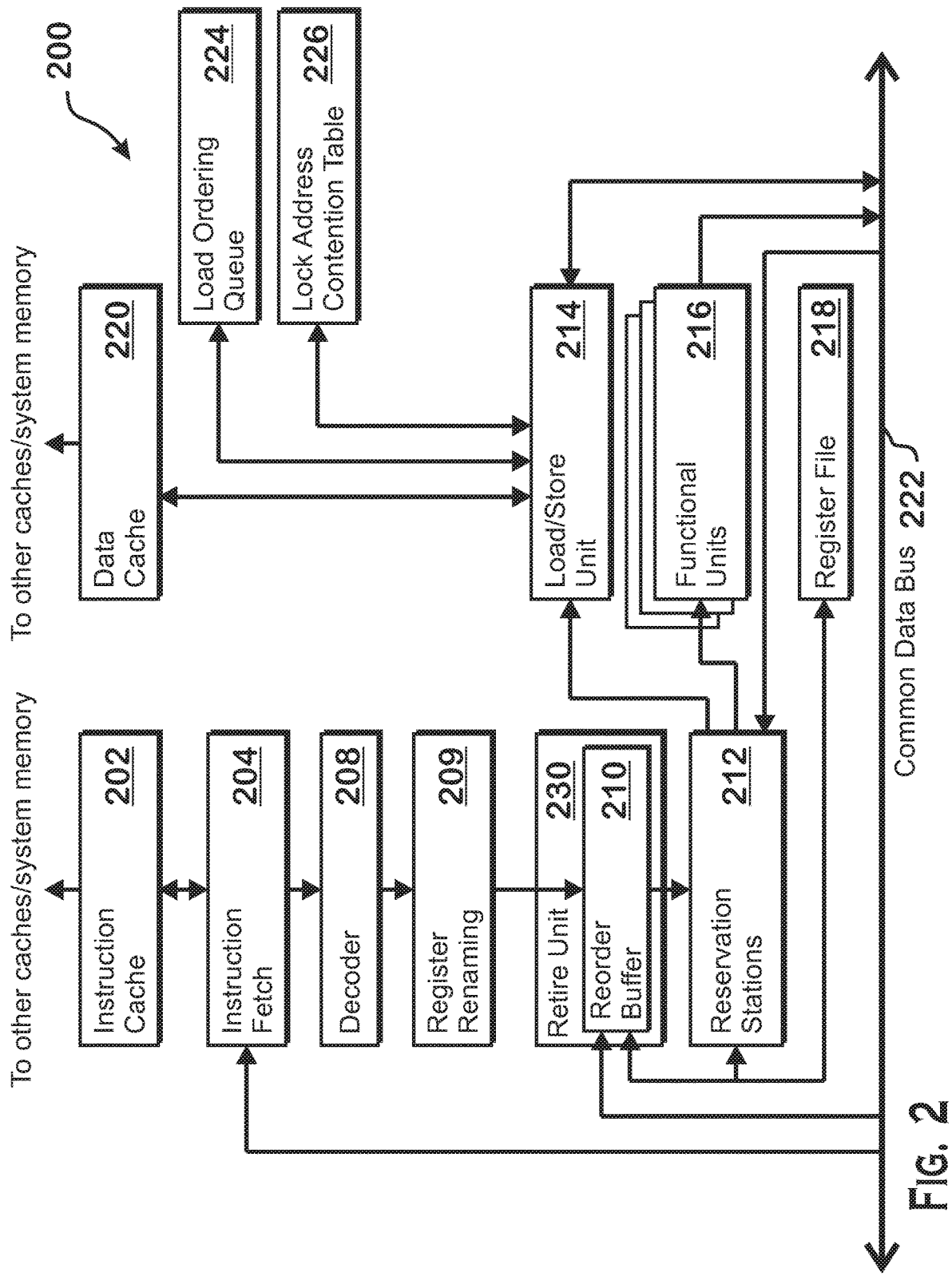
FIG. 2 is a block diagram of an instruction execution pipeline, included within a core of the processor of FIG. 1, according to an example.

FIG. 2 is a block diagram of an instruction execution pipeline 200, included within a core 116 of the processor 102 of FIG. 1, according to an example. The instruction execution pipeline 200 retrieves instructions from memory and executes the instructions, outputting data to memory and modifying the state of elements within the instruction execution pipeline 200, such as registers within register file 218.

The instruction execution pipeline 200 includes an instruction fetch unit 204 configured to fetch instructions from system memory (such as memory 104) via an instruction cache 202, a decoder 208 configured to decode fetched instructions, functional units 216 configured to perform calculations to process the instructions, a load/store unit 214, configured to load data from or store data to system memory via a data cache 220, and a register file 218, which includes registers that store working data for the instruction execution pipeline 200.

A reorder buffer 210 tracks instructions that are currently in-flight and ensures in-order retirement of instructions despite allowing out-of-order execution while in-flight. "In-flight" instructions refers to instructions that have been received by the reorder buffer 210 but have not yet "retired"—that is, have not yet had results committed to the architectural state of the processor (e.g., results written to architectural registers). Reservation stations 212 maintain in-flight instructions and track instruction operands. When all operands are ready for execution of a particular instruction, reservation stations 212 send the instruction to a functional unit 216 or a load/store unit 214 for execution.

When execution is complete, the instruction is said to be "completed" or to "have completed." Thus, an instruction that has "completed" means that execution of the instruction has finished. Saying that an instruction "executed" or "has executed" is synonymous with saying that an instruction is "completed" or "has completed." The retire unit 230 retires instructions ready for retirement, which happens after the instruction has completed.

The register renaming unit 209 renames the architectural registers specified by the instructions to physical registers present in the register file 218 in accordance with well-known register renaming techniques while the instructions are in-flight. As is generally known, register renaming de-serializes instructions that could be performed in parallel, thereby speeding up processor execution. Renamed registers are used for instructions that are in flight, whereas non-renamed "architectural" registers are deemed to store the "true" value for a particular architectural register. Architectural registers are written upon retirement of instructions. In this description, whenever the concept of "writing to architectural registers" is discussed, this concept can be substituted with the concept of simply assigning one of the physical registers to a particular architectural register (actually copying the contents of one register to another is not required).

Various elements of the instruction execution pipeline 200 communicate via a common data bus 222. For example, the functional units 216 and load/store unit 214 write results to the common data bus 222 which may be read by reservation stations 212 for execution of dependent instructions and by the reorder buffer 210 as the final processing result of an in-flight instruction that has finished execution. The load/store unit 214 also reads data from the common data bus 222. For example, the load/store unit 214 reads results from completed instructions from the common data bus 222 and writes the results to memory via the data cache 220 for store instructions.

The load/store unit 214 is coupled to a load ordering queue 224 and a lock address contention table 226. The load ordering queue 224 is present to ensure that load instructions appear to software to execute in order while also providing the processor 102 the freedom and associated processing speedups with actually executing these instructions out of order. More specifically, when a load instruction arrives at the load/store unit 214 and is otherwise ready to execute, the load/store unit 214 executes such instruction, regardless of program order. This execution occurs even though the potentially out-of-order execution means that a particular loaded value can become stale between the time that the load instruction is executed and the time that the load instruction is ready to retire due to being the oldest instruction in the reorder buffer 210. The lock address contention table 226 holds addresses that are considered "contended" by lock instructions from multiple cores 116. The lock address contention table 226 is described in more detail below.

A semaphore is a mechanism that allows for mutual exclusion by multiple threads in concurrent programming. Semaphores are used to guarantee that only one thread accesses shared memory or otherwise performs "critical" work that should only be performed by a single thread at a time. In use, a thread acquires a semaphore, performs the critical work, and then releases the semaphore so that other threads may use the semaphore. The act of acquiring a semaphore includes the use of an instruction that is atomic. An atomic instruction is guaranteed to appear to software as if the entire instruction fully executes without interference from other threads. An example of pseudo-assembly code for implementing the sequence of acquiring a semaphore, performing critical work, and then releasing the semaphore is provided below:

TABLE 1

Example semaphore code

```
spin_loop:
    load rax, [semaphore_addr]
    compare rax, 0
    jump-if-equal spin_loop
    //if rax is non-zero, fall through to here:
try_to_acquire_semaphore:
    mov rdx, 0
    mov rax, 1
    lock cmpxchg [semaphore_addr], rdx
    jump-if-ZF==0 spin_loop
    // if ZF==1, the semaphore is acquired
    ... //perform critical work
release_semaphore:
    store [semaphore_addr], 1 // mark the semaphore as available
```

Within the spin-loop (from label "spin_loop" to label "try_to_acquire_semaphore"), the "load rax, [sempahore_addr]" instruction loads the semaphore value (stored in memory at semaphore_addr) to the register rax. The "compare rax, 0" instruction compares the value in rax to 0 and the jump-if-equal spin_loop returns to label "spin_loop" if rax equals 0. For this code, the semaphore value of 0 represents that the semaphore is not available and the semaphore value of 1 represents that the semaphore is available.

If the semaphore is available (i.e., rax is 1, indicating that the semaphore is available), the core 116 executing the code falls through to label "try_to_acquire_semaphore." The "mov rdx, 0" instruction sets the register rdx to 0 and the "mov rax, 1" instruction sets the register rax to 1. The instruction "lock cmpxchg [semaphore_addr], rdx" is a complex instruction that atomically performs the following: compare the value at rax with the value at sempahore_addr; if the values are equal, then set the value at semaphore_addr to the value in rdx and set the Zero Flag (ZF) to 1; and if the values are not equal, then set rdx to the value at semaphore_addr and set the Zero Flag (ZF) to 0. Essentially, this instruction tests whether the value at semaphore_addr is still the same as the value in register rax that was obtained in the spin-loop, and if so, acquires the semaphore by setting the value at semaphore_addr to 0 (indicating that the semaphore is now unavailable). The lock prefix causes the cmpxchg instruction to execute atomically.

The attempt to acquire the semaphore may "fail" if another thread executes the "lock cmpxchg" instruction first. More specifically, since the "lock cmpxchg" instruction is atomic, only one thread is allowed to fully execute the instruction without interference from other threads. Thus, only one thread can successfully set the semaphore value to "0" after determining that the value in the rax register is equal to the value at semaphore_addr. The "lock cmpxchg" instruction would "fail" if that instruction determines that the value in rax is not equal to the value at semaphore_addr, which would indicate that another thread has acquired the semaphore. (More information on the cmpxchg instruction and the lock prefix can be found in the document "Intel® and IA-32 Architectures Software Developer's Manual, Combined Volumes: 1, 2A, 2B, 2C, 2D, 3A, 3B, 3C, and 3D," published June 2016, available at http://www.intel.com/content/dam/www/public/us/en/documents/manuals/64-ia-32-architectures-software-developer-manual-325462.pdf).

The Zero Flag (ZF) value indicates whether semaphore acquisition succeeded or failed. If semaphore acquisition failed (i.e., ZF is 0), then the next instruction (jump-if-ZF==0) returns to the spin-loop to detect when the semaphore is available again. If semaphore acquisition succeeded (i.e., ZF is 1), then the core 116 falls through to the "critical work" portion (instructions not provided because this work is generic and not specified herein), after which the core 116 executes the "store [semaphore_addr], 1" instruction to indicate that the semaphore is again available. The unused "release_semaphore" label is provided for clarity.

In a multi-core system, such as in the device 100 illustrated in FIG. 1, the process of attempting to acquire a semaphore in a manner similar to that described above can cause unnecessary cache coherency traffic. FIGS. 3A-3D illustrate examples of such cache coherency traffic. Each of FIGS. 3A-3D illustrate four cores 116 of the processor 102, each of which has a local cache 302. A coherence agent 304 of the processor 102 (or located elsewhere in device 100) provides cache coherency functionality.

Each local cache 302 includes one or more hierarchical cache levels that hold data for use by a respective core 116. For example, cache 302(1) holds data for use by core 116(1), cache 302(2) holds data for use by core 116(2), and so on. With the assistance of coherence agent 304, the cores 116 and caches 302 implement a migratory sharing cache coherency protocol that functions, in part, as follows. Cache lines can be in a shared state, an exclusive state, a modified state, a dirty-unmodified state, or an invalid state. The shared state indicates that the cache line is shared between two or more cores 116. The exclusive state indicates that the cache 302 in which the cache line is held is the only cache 302 that holds that cache line. The modified state indicates that the cache line has been modified since the data for that cache line was first transmitted to the cache 302 that it currently is in (and also that the cache line is only held in one cache 302). The dirty-unmodified state indicates that the cache line contains the most up-to-date data for the cacheline and memory (e.g., the memory 104 in FIG. 1) holds stale data for this cacheline, and this cacheline has not been written to since the data for that cache line was first transmitted to the cache 302 that it currently is in (and also that the cache line is only held in one cache 302). The invalid state indicates that the entry in the cache 302 corresponding to that cache line not contain valid data.

When a particular core 116 wishes to write to a particular cache line and that core 116 has that cache line in a shared state, the core 116 sends a write request to the coherence agent 304. In response, the coherence agent 304 sends invalidating probes to other cores 116 to cause the shared cache line in the caches 302 corresponding to those cores 116 to be invalidated. Upon invalidating those cache lines, those other cores 116 send an acknowledgment that the cache lines have been invalidated to the coherence agent 304. After receiving acknowledgment that the cache lines have been invalidated, the coherence agent 304 sends a response to the core 116 that originally transmitted the write request, which allows that core 116 to convert its cache line to an exclusive state. After that core 116 writes the value, the core 116 changes the state of that cache line to a modified state.

When a particular core 116 wishes to read from a particular cache line that is not stored in the cache 302 associated with that core 116, that core 116 transmits a read-fill request to the coherence agent 304. In response to receiving the read-fill request, the coherence agent 304 transmits a read probe to one or more cores 116 that hold the cache line. If multiple caches 302 hold that cache line, then one of the caches 302 transmits the cache line to the requesting core 116 which fills its cache 302 with that cache line and marks the cache line shared. If only a single cache 302 holds that cache line, then the core 116 associated with that cache 302 determines whether the cache line is in a modified state, dirty-unmodified state or an exclusive state.

If the cache line is in an exclusive state, meaning that the cache line was not written to after the cache 302 received that cache line, or if the cache line is in a dirty-unmodified state, then the cache 302 converts that cache line to a shared state and returns the cache line to the requesting cache 302. That cache 302 receives the cache line in a shared state. If the cache line is in a modified state, meaning that the cache line was written to after the cache 302 that currently holds the cache line received the cache line, then the cache 302 responds according to the migratory sharing protocol. More specifically, the cache 302 invalidates the cache line and transmits the cache line to the requesting core 116 along with an indication that that core 116 should hold that cache line in a dirty-unmodified state. The migratory sharing protocol assumes a paradigm in which different cores 116 operate on cache lines in a sequence of read-modify operations. Responding to read requests by granting exclusive access to cache lines in a dirty-unmodified state removes the need to transmit both a read request and a write request in the above-described common situation where the core 116 reads and then writes to a cache line. Because a read request returns a cache line in an exclusive state, the core 116 that receives that cache line does not also need to send a write request upon writing to that cache line.

Figure 3C:
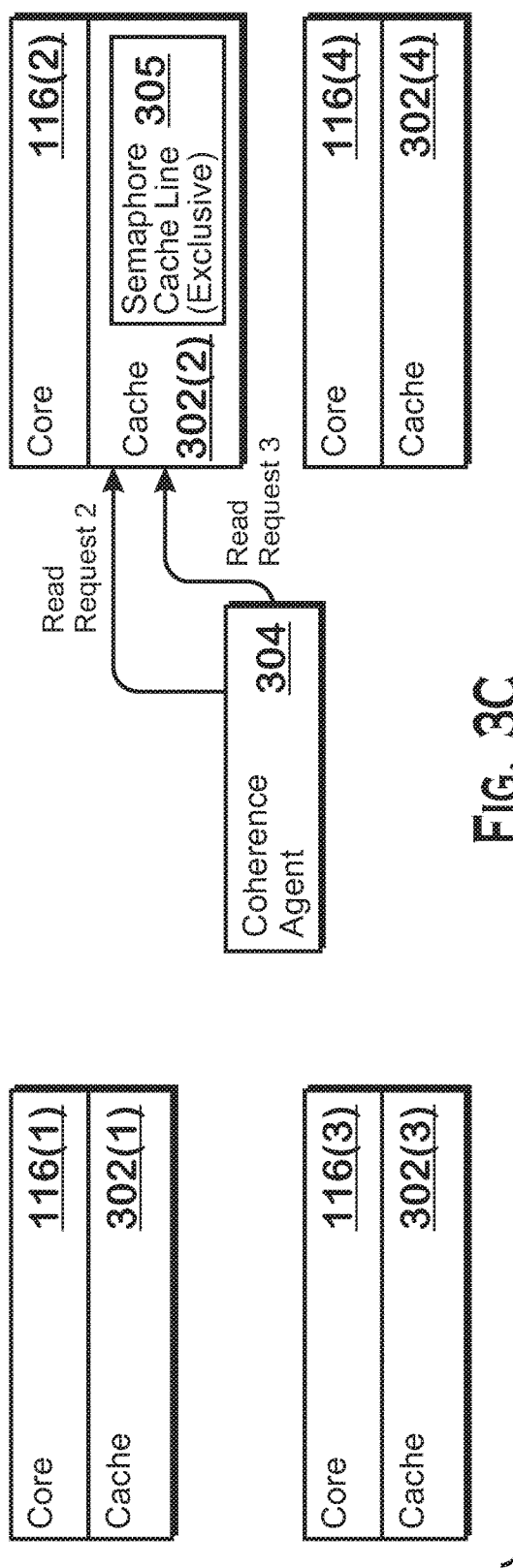

FIGS. 3A-3D illustrate a situation in which the semaphore acquisition described above can cause a greater-than-desirable amount of cache traffic with the migratory sharing cache coherence protocol described herein. FIG. 3A illustrates cores 116 of a processor 102, and their associated local caches 302, just after a first core 116(1) has written to a semaphore cache line 305 to indicate that the first core 116(1) has finished its critical work for the semaphore (i.e., after the first core 116(1) has executed the "store [semaphore_addr], 1" instruction). Prior to the state illustrated in FIG. 3A, the semaphore cache line 305 was in a shared state because other cores 116 were reading the value of the semaphore in the spin-loop described above (i.e., executing the "load rax, [semaphore_addr]" instruction).

After the first core 116(1) has executed the "store [semaphore_addr], 1" instruction, because the semaphore cache line 305 was recently written to by the first core 116(1), that cache line is in a modified state in cache 302(1). Because the other cores 116 are executing their spin-loops, and those cores do not have the semaphore cache line 305 in their caches 302, each of those cores 116 transmit a read request to the coherence agent 304. The coherence agent 304 processes these requests serially because these requests are all to the same cache line. Thus, the coherence agent 304 processes one of these requests first.

In FIG. 3B, the read request from the second core 116(2) (i.e., the "read request 1") has been processed first, meaning that the coherence agent 304 has transmitted a read probe to the first core 116(1), which has the cache line in a modified state. Because the first core 116(1) has the cache line in a modified state, the first core 116(1) responds according to the migratory sharing aspect of the coherency protocol. More specifically, the first core 116(1) invalidates the cache line in its own cache 302(1) and migrates that cache line to the cache 302(2) in an exclusive (dirty-unmodified) state.

The first core 116(1) also transmits the new state to the coherence agent 304 for its records.

In the next state, shown in FIG. 3C, the second core 116(2) has the semaphore cache line 305 in an exclusive state. Read requests from the third core 116(3) and the fourth core 116(4) are pending in the coherence agent 304, which processes these read requests by transmitting these read requests to the second core 116(2). When received by the second core 116(2), the second core 116(2) changes the state of the semaphore cache line 305 to shared and transmits the cache line to third core 116(3) and the fourth core 116(4) to store in a shared state in their caches 302.

Figure 3D:
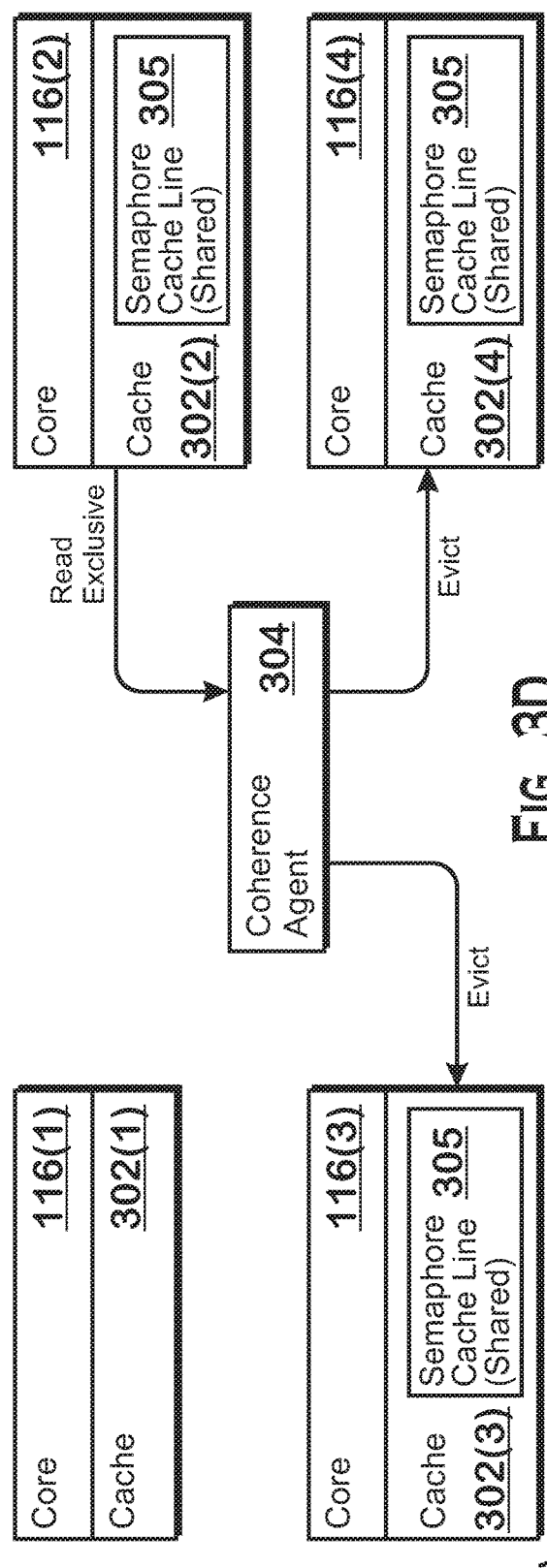

At this point, the second core 116(2), the third core 116(3), and the fourth core 116(4) have read the semaphore and believe that the semaphore is available. Each core 116 executes the "lock cmpxchg" instruction to attempt to acquire the semaphore, but one of these executes first. Part of this execution is to exclusively acquire the semaphore cache line 305 so that the core 116 executing this instruction can atomically read, modify, and write the semaphore. In FIG. 3D, the second core 116(2) is the core that executes the "lock cmpxchg" instruction first and thus transmits a write request to coherence agent 304. In response, the coherence agent 304 transmits evict messages to the third core 116(3) and to the fourth core 116(4), which causes those cores to invalidate their copies of the semaphore cache line 305 so that the second core 116(2) has the semaphore cache line exclusively.

The "lock cmpxchg" instruction for the third core 116(3) and for the fourth core 116(4) are eventually executed and also result in those cores making write requests to the coherence agent 304, which in turn causes the coherence agent 304 to send invalidating probes to the core that currently holds the cacheline in an exclusive state. However, on the third core 116(3) and the fourth core 116(4), the "lock cmpxchg" instruction results in a failure to acquire the semaphore as discussed above (i.e., rdx is 0—the semaphore is not available), causing those cores to return to the spin-loop.

The above description illustrates that a certain amount of "unnecessary" cache traffic occurs. More specifically, after the first core 116(1) releases the semaphore, the second core 116(2) receives the semaphore cache line 305 in an exclusive state due to the migratory sharing aspect of the cache coherence protocol. This involves the cache traffic of sending the cache line to the second core 116(2) (FIG. 3B). Subsequently, the other cores—the third core 116(3) and the fourth core 116(4)—request the semaphore cache line 305, which involves the cache traffic of sending the cache line to those other cores (FIG. 3C) to be held in a shared state. After this, one of the cores requests access to the cache line in an exclusive state (for the lock cmpxchg instruction), which causes the other cores to invalidate their copy of that cache line (FIG. 3D). The cache traffic of sending the cache line to the other cores in response to the request of the cache line in the shared state (FIG. 3C) was unnecessary because in the end, only one of the cores ends up with the cache line. Thus sending the cache line to these cores is unnecessary extra cache traffic that represents an inefficient cache coherency operation. Additionally, obtaining the cache line in an exclusive state (FIG. 3B), transmitting the cache line to other cores (FIG. 3C), and then re-obtaining the cache line in an exclusive state (FIG. 3D) represents additional latency as compared with the situation that would have occurred if a core had obtained the cache line in an exclusive state in the first place.

Figure 4:
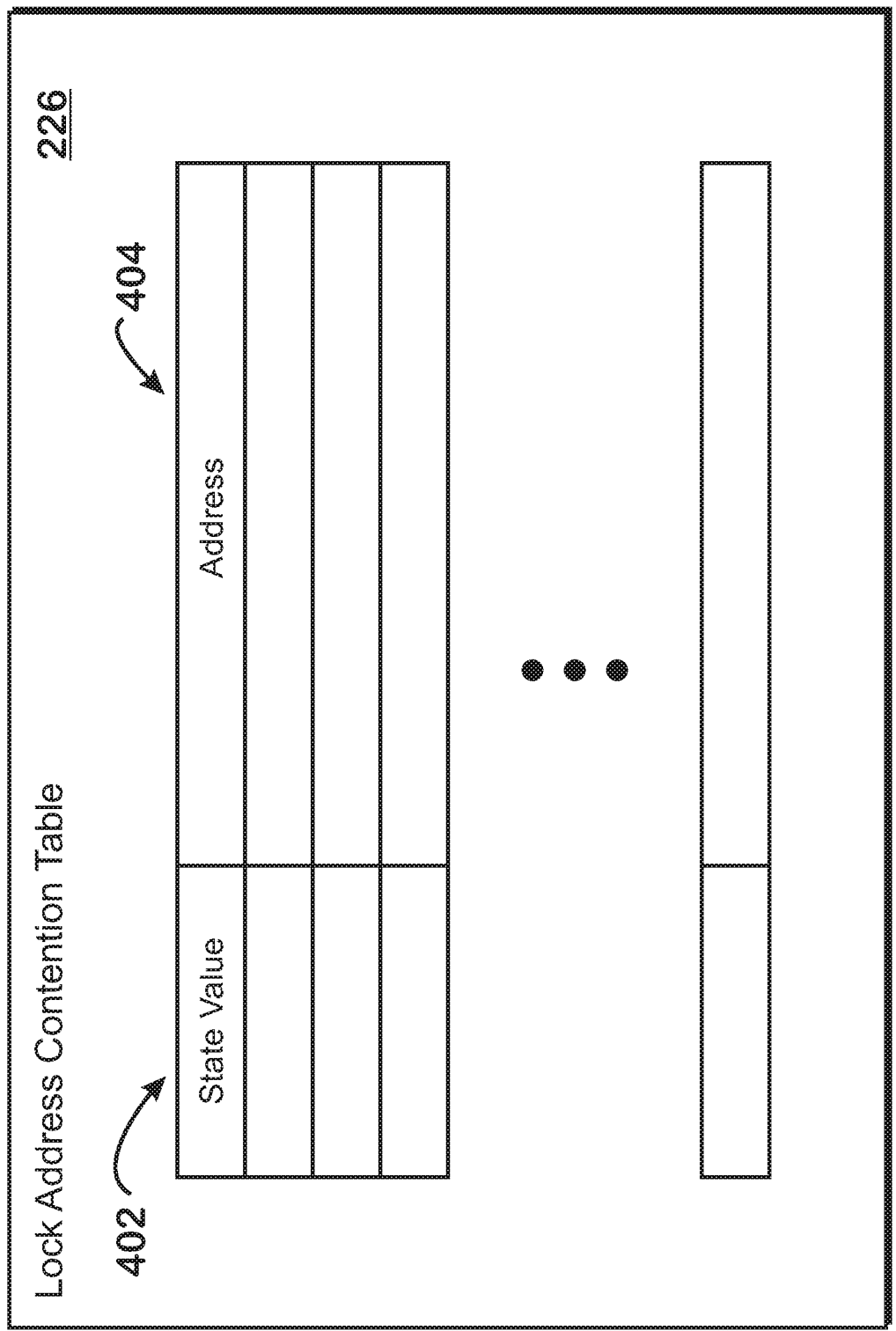
FIG. 4 is a block diagram of a lock address contention table to help reduce the unnecessary cache traffic associated with acquisition of a contended semaphore, according to an example.

FIG. 4 is a block diagram of a lock address contention table 226 to help reduce the unnecessary cache traffic associated with acquisition of a contended semaphore, according to an example. The lock address contention table 226, which is included in each core 116, includes state machine values 402 that are state values for each address 404 that is the subject of contended locks. The state machine values 402 helps to "predict" when a core 116 is the first core 116 to detect that a semaphore is available so that that core 116 can refuse ("negative acknowledge" or "nack") requests to transmit that cache line to other cores 116 due to the spin-loop loads from the other cores 116 ("load rax, [semaphore_addr]") in the situation described with respect to FIG. 3C.

For each address 404 in the lock address contention table 226, the each state machine value 402 can be one of four possible values. A value of zero is the reset value. A value of 1 is reached when a non-lock load hits the corresponding address. This value is an indication that one or more threads are sitting in the spin-loop, reading the semaphore to determine whether that semaphore is available.

A value of 2 indicates that the cache line associated with that address has just been evicted. This is an indication that the thread holding the semaphore has just asked to write to that semaphore to release that semaphore, indicating that the thread has completed its critical work. A value of 3 indicates that the cache line associated with that address has been filled in an exclusive state (or, more specifically, a dirty-unmodified state). This is an indication that the core 116 for which the value of 3 has been reached is the first core 116 to obtain the semaphore cache line 305 after the semaphore was written to with an available value, in accordance with the migratory sharing protocol (e.g., as shown in FIG. 3B). To reach state value 3, an address must go through each earlier state in sequence. If one of the state-changing events occurs out of order, the state of the address returns to state 0.

In response to detecting that an address in the lock address contention table 226 has reached state 3, the core 116 responds to requests for the cache line (including read-shared and write) with a negative acknowledgment ("nacks" the requests), which is an indication that the core 116 refuses the received request. The core 116 continues to nack such incoming requests until a programmable number of cycles has occurred, after which the core 116 stops nacking all requests due to the state having a value of 3. The core 116 returns to operating according to the cache coherence protocol described above, not nacking all requests (although the core 116 may otherwise nack requests in accordance with "normal operations"). Also, after the programmable number of cycles has expired, the state returns to value 0. The purpose of the programmable number of cycles in which the core 116 nacks incoming cache requests is to provide a "bridge" to the cmpxchg instruction, which nacks incoming requests because it is atomic, which reduces the unnecessary cache traffic described above. Each core 116 has its own lock address contention table 226 and thus maintains the above-described state values independently.

One example technique for detecting which addresses correspond to a contended lock instruction is now described. Lock instructions are instructions that include a load component, an "op" (operation) component, and a store component. More specifically, a lock instruction reads data from a memory address, modifies that data according to a specified operation, and writes the modified data back to the memory address. Lock instructions have both an atomic property and a fencing property. The atomic property means that it appears to software as if in between the time the lock instruction reads the data and the time instruction writes the data, no stores can be made to the memory address specified by the lock instruction. The fencing property means that it appears to software as if the lock instruction waits for all older loads to complete and stores to commit within the same thread as the lock instruction before executing. All loads and stores younger than the lock instruction within the same thread as the lock instruction wait for the lock instruction to complete before execution.

The lock address contention table 226 stores addresses that are considered "contended" by lock instructions from multiple cores 116. Addresses are considered to be contended by lock instructions when two or more threads attempt to access that address via a lock instruction within a given amount of time. In one example, such "contentious" access is detected as a side-effect of a technique for allowing speculative retirement of lock instructions. Such technique includes "relaxing" the fencing and atomic properties of lock instructions and allowing lock instructions to speculatively retire without the "normal" safeguards in place for lock instructions. Relaxing the atomic and fencing properties of those instructions includes allowing the lock instruction and younger instructions to retire instead of causing the lock instruction to wait for all older loads and stores to retire before retiring and instead of causing the younger loads and stores to wait for the lock instruction to retire before retiring.

While those properties are relaxed, if a violation of the fencing or atomic property is detected by the load/store unit 214, the load/store unit 214 rolls back state of the processor to before retirement of the lock instruction and re-executes the lock instruction in "safe" mode, in which the fencing and atomic properties are applied more strictly (meaning that the lock instruction waits for all older loads and stores to retire before retiring and causes the younger loads and stores to wait for the lock instruction to retire before retiring). An address is considered to correspond to a contended lock instruction upon detection of a violation of the atomic or fencing property in this relaxed state. Thus, detection of a violation of the atomic or fencing property causes the load/store unit 214 to write an entry corresponding to the address accessed by the lock instruction into the lock address contention table 226.

Violation of one of the properties of a lock instruction is detected by detecting an invalidating probe in the load ordering queue 224 for the address referenced by the lock instruction or for the address referenced by a load younger than the lock instruction, within a "critical" time period. This critical time period begins when the load portion of the lock instruction executes and ends when the store portion of the lock instruction commits. The term "commit" refers to an event related to the store portion of the lock instruction. More specifically, store instructions (and operations such as the store portion of the lock instruction) execute and retire. However, the value to be stored is not yet written to memory at that point due to memory access latency. The act of actually writing the value to memory is called "committing" the store instruction.

Another example technique for detecting which addresses correspond to a contended lock instruction is now described. This second technique involves speculative execution of lock instructions. With speculative execution of lock instructions, the load portion of the lock instruction executes to obtain the value to modify and the op portion and younger dependent instructions are executed using that speculative value. A lock instruction that is executed speculatively is not allowed to retire while that lock instruction is in a speculative state, and the fencing properties of the lock instruction are not relaxed, in contrast with the speculatively retired lock instruction described above. The lock instruction is in a speculative state from the time the load portion of the lock instruction executes to the time that the lock instruction is at the head of the reorder buffer 210 and is thus ready to retire.

When the lock instruction becomes non-speculative (i.e., is no longer in a speculative state) and when the fencing property has been satisfied (i.e., when all older loads and stores have retired), the lock instruction "re-executes" in the load/store unit 214. If the data became stale while the lock instruction was in a speculative state, then the load/store unit 214 reports this failed speculation to the retire unit 230 by indicating that the instruction caused a microarchitectural "fault." In response, the retire unit 230 flushes the pipeline and restarts execution starting with the lock instruction, which is executed non-speculatively. Non-speculative execution includes "nacking" any probes to the cache line referenced by the lock instruction. Executing non-speculatively means that the lock instruction does not execute until all older loads and stores have retired and that all younger loads and stores wait for the lock instruction to retire before executing. If the data does not become stale while the lock instruction was executing in a speculative state, then "re-execution" of the lock instruction simply involves noting that the speculative execution was correct and reporting successful completion (no fault) to the retire unit 230 (no literal re-execution actually occurs in this instance). The retire unit 230 retires the lock instruction and further processing occurs without a pipeline flush.

Testing for whether data becomes stale is done by detecting that an invalidating probe to the cache line of the address referenced by the lock instruction occurs during the period in which the lock instruction is considered to be speculatively executing, or that an eviction of that cache line occurs during the period in which the lock instruction is considered to be speculatively executing. A determination that the data becomes stale is also an indication that the address referenced by the lock instruction is considered a contended lock address. Thus, if such a determination occurs, the load/store unit 214 writes the address referenced by the lock instruction into the lock address contention table 226.

FIGS. 5A and 5B illustrate cache operations utilizing the lock address contention table 226, according to an example. In FIG. 5A, the second core 116(2) has just determined that the semaphore cache line 305 is at state 3 and is receiving read requests and other requests from different cores such as the third core 116(3) and the fourth core 116(4). In FIG. 5B, because the semaphore cache line 305 is at state 3, the second core 116(2) responds to incoming requests with negative acknowledgments, allowing the second core 116(2) to keep the semaphore cache line 305 in an exclusive state and not transfer the semaphore cache line 305 to the other cores 116 in an unnecessary manner.

Figure 6:
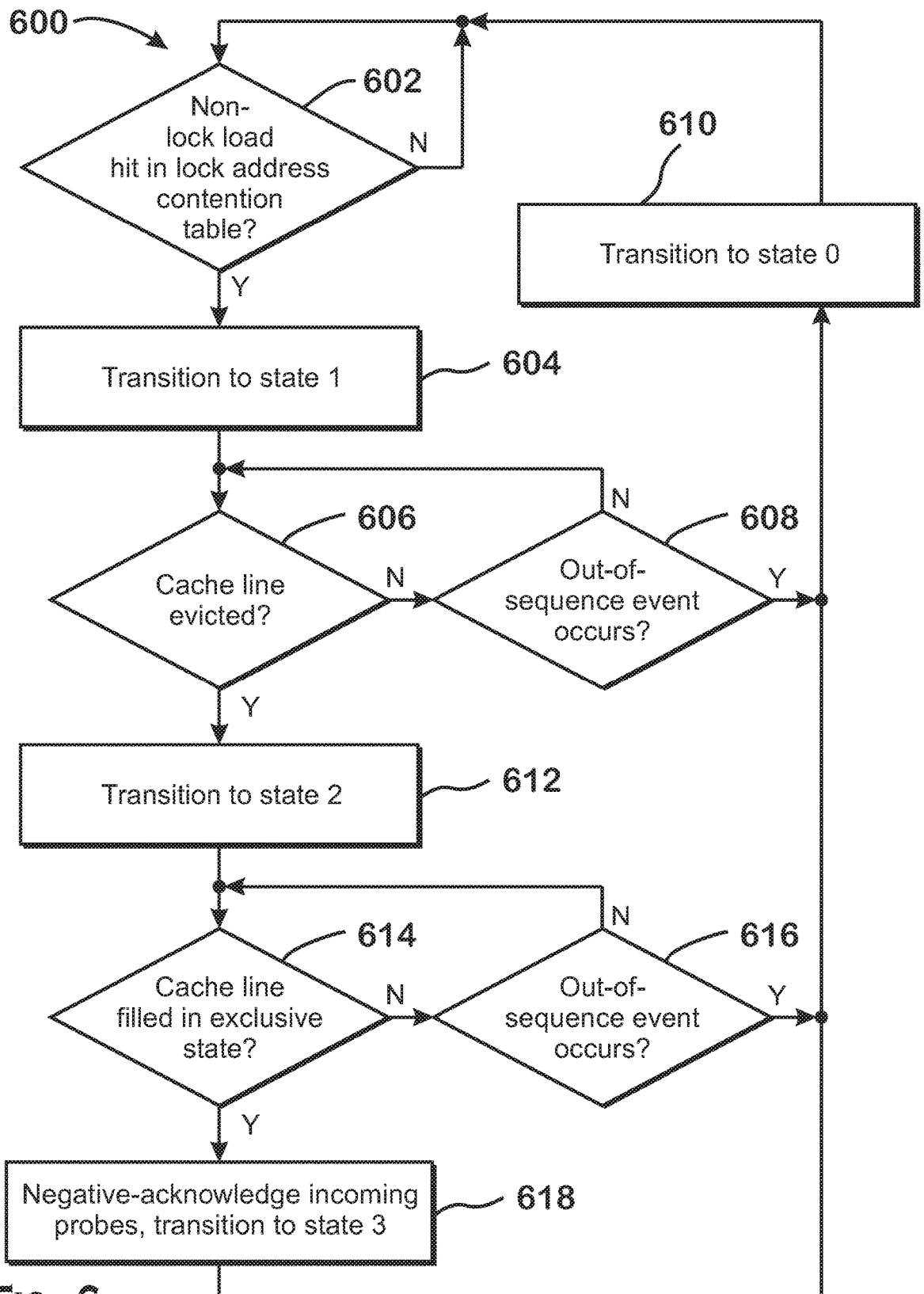
FIG. 6 is a flow diagram of a method for performing semaphore-related cache traffic operations, according to an example.

FIG. 6 is a flow diagram of a method 600 for performing semaphore-related cache traffic operations, according to an example. Although described with respect to the system shown and described in FIGS. 1-2, 3A-3D, 4, and 5A-5B, it should be understood that any system configured to perform the method, in any technically feasible order, falls within the scope of the present disclosure.

The method 600 begins at step 602, where a core 116 determines whether the core 116 detects a non-lock load hitting in the lock address contention table 226, which is an indication that cores 116 are reading the semaphore in the spin-lock. If no such load is detected, the method returns to step 602 and if such a load is detected, then the method 600 proceeds to step 604. At step 604, the core 116 transitions the state value for the address of the load to 1. At step 606, the core 116 determines whether the cache line for which the state is 1 has been evicted. Such an eviction would be an indication that a thread that owns the semaphore has written to the semaphore to indicate that the semaphore is released. If such an event is detected, then the method proceeds to step 612 and if no such event is detected, then the method 600 proceeds to step 608. At step 608, the core 116 determines whether an out-of-sequence event occurs for the cache line. An out-of-sequence event includes either the event at step 602 (a non-lock load detected at that cache line) or the event at step 614 (the cache line being filled in an exclusive state). If an out-of-sequence event occurs, then the method 600 proceeds to step 610, where the cache line state transitions to 0. If, at step 608, an out-of-sequence event does not occur, then the method 600 returns to step 606.

Referring back to step 612, because the cache line is evicted at step 606, the core 116 transitions the cache line to state 2. After step 612, the method proceeds to step 614, at which the core 116 determines whether the cache line is filled in an exclusive state. As stated above, such an action would indicate that the core 116 received the cache line in an exclusive state due to being the first core 116 to send a read probe to another core that has modified that cache line. If the cache line is filled in an exclusive state, then the method 600 proceeds to step 618 and if the cache line is not filled in an exclusive state, then the method 600 proceeds to step 616. At step 616, the core 116 determines whether the core detects an out-of-sequence event (either of the events at step 602 or at step 606). If an out-of-sequence event occurs, then the method 600 proceeds to step 610 and if an out-of-sequence event does not occur, then the method 600 returns to step 614. At step 618, the core 116 has determined that the core 116 is the first core 116 to see the semaphore stored in the cache line as available, transitions to state 3, and nacks all probes for a fixed number of cycles. After step 618, the method 600 returns to step 610.

The techniques described herein improve cache traffic performance in the context of contended lock instructions. More specifically, each core maintains a lock address contention table that stores addresses corresponding to contended lock instructions. The lock address contention table also includes a state value that indicates progress through a series of states meant to track whether a load by the core in a spin-loop associated with semaphore acquisition has obtained the semaphore in an exclusive state. Upon detecting that a load in a spin-loop has obtained the semaphore in an exclusive state, the core responds to incoming requests for access to the semaphore with negative acknowledgments. This allows the core to maintain the semaphore cache line in an exclusive state, which allows it to execute its "lock cmpxchg" instruction immediately without sending a write request to the coherence agent. It also avoids transmitting that cache line to other cores unnecessarily. Additionally, use of the state machine allows for a "smart" determination of when to respond to the incoming requests with negative acknowledgments ("nacks"). Some options without a state machine include nacking all newly filled lines for a fixed number of cycles, or nacking all newly filled lines that match an address held in the lock address contention table for a fixed number of cycles. These options, however, "overcompensate" for the specific cache traffic issue described above. More specifically, using a state machine for performing above-described nacks helps to reduce traffic once a core has obtained a cache line holding a contended lock in an exclusive state. However, nacking acknowledgments at times other than this specific instance could actually increase cache latency by preventing various cache coherency activity that should occur from occurring.

It should be understood that many variations are possible based on the disclosure herein. For example, although specific values are listed for the states of semaphore addresses, values other than those explicitly described (0, 1, 2, 3) could alternatively be used. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements features of the above disclosure.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for handling cache coherency traffic for a contended semaphore, the method comprising:
   a first detection, comprising detecting a non-lock load to an address associated with the contended semaphore, wherein the address associated with the contended semaphore is stored in a lock address contention table;
   responsive to the first detection, associating a first state value with the address in the lock address contention table;
   a second detection, comprising detecting that a cache line associated with the contended semaphore is evicted;
   responsive to the second detection, associating a second state value with the address in the lock address contention table;
   a third detection, comprising detecting a fill of the cache line in an exclusive state;
   responsive to the third detection, associating a third state value with the address in the lock address contention table; and
   responsive to the first detection, the second detection, and the third detection, entering a semaphore cache line protection mode in which requests for access to the cache line associated with the contended semaphore are responded to with negative acknowledgments that prevent access to the cache line associated with the contended semaphore.

2. The method of claim 1, further comprising:
   entering the semaphore cache line protection mode occurs responsive to the first detection, the second detection, and the third detection occurring in order and without an out-of-sequence event occurring therebetween.

3. The method of claim 2, wherein the out-of-sequence event comprises one or more of:
   any non-lock load to the address associated with the contended semaphore after the first detection but before the second detection or after the second detection but before the third detection, or
   any fill of the cache line in an exclusive state after the first detection but before the second detection.

4. The method of claim 1, wherein entering the semaphore cache line protection mode comprises entering the semaphore cache line protection mode for a first number of cycles, and, after the first number of cycles, leaving the semaphore cache line protection mode.

5. The method of claim 1, wherein:
   the non-lock load is included within a spin-loop of a semaphore acquisition sequence.

6. The method of claim 1, wherein:
   the cache line associated with the contended semaphore is evicted responsive to a core that owns the contended semaphore requesting to write a value to the contended semaphore indicating that the contended semaphore is available.

7. The method of claim 1, wherein the fill of the cache line in the exclusive state occurs responsive to a lock instruction for acquiring the semaphore.

8. A processing unit comprising:
   a processing core including a load/store unit; and
   a cache,
   wherein the load/store unit is configured to handle cache coherency traffic for a contended semaphore by:
      performing a first detection, comprising detecting a non-lock load to an address associated with the contended semaphore, wherein the address associated with the contended semaphore is stored in a lock address contention table;
      responsive to the first detection, associating a first state value with the address in the lock address contention table;
      performing a second detection, comprising detecting that a cache line associated with the contended semaphore is evicted;
      responsive to the second detection, associating a second state value with the address in the lock address contention table;
      performing a third detection, comprising detecting a fill of the cache line in an exclusive state
      responsive to the third detection, associating a third state value with the address in the lock address contention table; and
      responsive to the first detection, the second detection, and the third detection, entering a semaphore cache line protection mode in which requests for access to the cache line associated with the contended semaphore are responded to with negative acknowledgments that prevent access to the cache line associated with the contended semaphore.

9. The processing unit of claim 8, wherein the load/store unit is configured to:
   enter the semaphore cache line protection mode responsive to the first detection, the second detection, and the third detection occurring in order and without an out-of-sequence event occurring therebetween.

10. The processing unit of claim 8, wherein the out-of-sequence event comprises one or more of:
    any non-lock load to the address associated with the contended semaphore after the first detection but before the second detection or after the second detection but before the third detection, or
    any fill of the cache line in an exclusive state after the first detection but before the second detection.

11. The processing unit of claim 8, wherein the load/store unit is configured to:
    leave the semaphore cache line protection mode after a first number of cycles has elapsed subsequent to entering the semaphore cache line protection mode.

12. The processing unit of claim 8, wherein:
    the non-lock load is included within a spin-loop of a semaphore acquisition sequence.

13. The processing unit of claim 8, wherein:
    the cache line associated with the contended semaphore is evicted responsive to a core that owns the contended semaphore requesting to write a value to the contended semaphore indicating that the contended semaphore is available.

14. The processing unit of claim 8, wherein the fill of the cache line in the exclusive state occurs responsive to a lock instruction for acquiring the semaphore.

15. A processor, comprising:
    a plurality of processing cores coupled together, each processing core including a load/store unit; and
    a plurality of caches, each cache associated with a respective processing core of the plurality of processing cores,
    wherein the load/store unit of each processing core of the plurality of processing cores is configured to handle cache coherency traffic for a contended semaphore by:
       performing a first detection, comprising detecting a non-lock load to an address associated with the contended semaphore, wherein the address associated with the contended semaphore is stored in a lock address contention table;
       responsive to the first detection, associating a first state value with the address in the lock address contention table;
       performing a second detection, comprising detecting that a cache line associated with the contended semaphore is evicted;
       responsive to the second detection, associating a second state value with the address in the lock address contention table;
       performing a third detection, comprising detecting a fill of the cache line in an exclusive state;
       responsive to the third detection, associating a third state value with the address in the lock address contention table; and
    responsive to the first detection, the second detection, and the third detection, entering a semaphore cache line protection mode in which requests for access to the cache line associated with the contended semaphore are responded to with negative acknowledgments that prevent access to the cache line associated with the contended semaphore.

* * * * *